United States Patent
Iizuka et al.

(10) Patent No.: US 10,355,418 B2
(45) Date of Patent: Jul. 16, 2019

(54) NOISE REDUCTION UNIT

(71) Applicants:Yazaki Corporation, Tokyo (JP); TOYOTA JIDOSHA KABUSHIKI KAISHA, Toyota-shi, Aichi-ken (JP)

(72) Inventors: Hayato Iizuka, Kakegawa (JP); Kazuma Kayo, Kakegawa (JP); Hiroshi Aihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/018,311

(22) Filed: Jun. 26, 2018

(65) Prior Publication Data

US 2018/0375261 A1   Dec. 27, 2018

(30) Foreign Application Priority Data

Jun. 27, 2017 (JP) ................................ 2017-125075

(51) Int. Cl.
*H01R 13/648* (2006.01)
*H01R 13/658* (2011.01)
(Continued)

(52) U.S. Cl.
CPC ....... *H01R 13/658* (2013.01); *B60R 16/0207* (2013.01); *H01B 11/1083* (2013.01);
(Continued)

(58) Field of Classification Search
CPC .............. H01R 13/658; H01R 13/7193; H01R 13/6485; H01R 24/40; H02G 3/081; H02G 15/113; H02G 3/088; H02G 3/0487; H01F 2017/065; H01F 17/062; H01F 27/33; H01B 11/1083; B60R 16/0207

USPC .................................................... 439/607.01
See application file for complete search history.

(56) References Cited

U.S. PATENT DOCUMENTS 10,163,563 B2 * 12/2018 Shitama ................. H01F 27/24
2012/0126928 A1 * 5/2012 Yoshikawa ........... H01F 27/306
336/221
(Continued)

FOREIGN PATENT DOCUMENTS

DE    11 2015 002 145 T5    1/2017
JP          60-254604 A    12/1985
(Continued)

OTHER PUBLICATIONS

Extended European Search Report dated Nov. 7, 2018 issued by the European Patent Office in Counterpart European Application No. 18180047.5.
(Continued)

*Primary Examiner* — Jean F Duverne
(74) *Attorney, Agent, or Firm* — Sughrue Mion, PLLC (57) ABSTRACT

A noise reduction unit (100) is equipped with a noise filter (10), a housing (80) which houses the noise filter, and a sealing material (90) which is charged in the housing. The noise filter is equipped with conductors (20) having respective winding portions (21) and a ring-shaped core (30) which is made of a magnetic material and is inserted through the winding portions of the conductors. In the housing, a mounting portion (83) for the ring-shaped core has recesses (84) that are recessed in a direction going away from the ring-shaped core and support portions (83*b*) that support the ring-shaped core so that gaps (S) are formed between the ring-shaped core and the bottom surfaces of the respective recesses. The sealing material goes into the gaps and comes into contact with both of the ring-shaped core and the bottom surfaces of the recesses in the mounting portion.

7 Claims, 8 Drawing Sheets

(51) Int. Cl.
*B60R 16/02* (2006.01)
*H01B 11/10* (2006.01)
*H01F 17/06* (2006.01)
*H01R 24/40* (2011.01)
*H02G 3/04* (2006.01)
*H02G 3/08* (2006.01)
*H02G 15/113* (2006.01)
*H01F 27/33* (2006.01)
*H01B 7/17* (2006.01)
*H01R 13/7193* (2011.01)

(52) U.S. Cl.
CPC ........... *H01F 17/062* (2013.01); *H01F 27/33* (2013.01); *H01R 13/6485* (2013.01); *H01R 24/40* (2013.01); *H02G 3/0487* (2013.01); *H02G 3/088* (2013.01); *H02G 15/113* (2013.01); *H01B 7/17* (2013.01); *H01F 2017/065* (2013.01); *H01R 13/7193* (2013.01); *H02G 3/081* (2013.01)

(56) References Cited

U.S. PATENT DOCUMENTS

| | | |
|---|---|---|
| 2012/0194311 A1 | 8/2012 | Suzuki |
| 2012/0223794 A1* | 9/2012 | Asakura .................. H01F 27/06 336/65 |
| 2013/0039815 A1* | 2/2013 | Murata .................. H01F 27/02 422/129 |
| 2013/0241686 A1 | 9/2013 | Nakatsu et al. |
| 2014/0085026 A1* | 3/2014 | Yamada .................. H01F 37/00 336/90 |
| 2014/0217642 A1* | 8/2014 | Suzuki .................. B29C 70/68 264/259 |
| 2015/0061817 A1 | 3/2015 | Lee et al. |
| 2017/0053733 A1 | 2/2017 | Misaki et al. |
| 2017/0174152 A1 | 6/2017 | Yamaguchi et al. |

FOREIGN PATENT DOCUMENTS

| | | |
|---|---|---|
| JP | 4369167 B2 | 11/2009 |
| JP | 2011-109499 A | 6/2011 |
| JP | 2013-38324 A | 2/2013 |
| JP | 2015-50459 A | 3/2015 |
| JP | 2017-112064 A | 6/2017 |
| JP | 2017-112323 A | 6/2017 |

OTHER PUBLICATIONS

Office Action dated Jan. 22, 2019 by the Japanese Patent Office in counterpart Japanese Patent Application No. 2017-125075.

* cited by examiner

NOISE REDUCTION UNIT

CROSS-REFERENCES TO RELATED APPLICATION(S)

This application is based on and claims priority from Japanese Patent Application No. 2017-125075 filed on Jun. 27, 2017, and the entire contents of which are incorporated herein by reference.

BACKGROUND

The present invention relates to a noise reduction unit.

Noise reduction units for reducing noise occurring in an electric wire has been used. As a specific example, a noise reduction unit is known which is equipped with a ring-shaped core that is a circular magnetic body having an insertion hole through which an electric wire is inserted and a case that houses the ring-shaped core. This noise reduction unit reduces noise occurring in the electric wire inserted through the insertion hole of the ring-shaped core by absorbing, with the ring-shaped core, high-frequency noise such as a surge current flowing through the electric wire.

As for details of the above mounting structure, refer to JP 4369167 B and JP 2013-038324 A.

SUMMARY

In actuality, the above-described conventional noise reduction unit is used in such a manner that a case-incorporated ring-shaped core in which a case is attached to a ring-shaped core in advance is attached to an electric wire (from outside). On the other hand, another noise reduction unit is known which is produced in such a manner that a conductor is wound on a ring-shaped core in advance and the ring-shaped core and the conductor are housed in a case (housing) together. In this reduction unit, when the ring-shaped core and the conductor are housed in the housing, a sealing material such as a resin may be charged so as to fill up gaps between the housing and the ring-shaped core and the conductor from the viewpoints of fixing, protection, etc. of the ring-shaped core and the conductor.

Incidentally, in the above noise reduction units, high-frequency noise is reduced by converting it into heat utilizing magnetic loss in the ring-shaped core (magnetic body). Because of this principle of operation, the ring-shaped core heats up during operation of the noise reduction unit. To avoid overheating of the ring-shaped core, it is desirable to release heat generated in the ring-shaped core to outside the noise reduction unit.

However, when as described above the ring-shaped core etc. are sealed in the housing using a sealing material, there may occur, depending on various sealing conditions, a case that the gaps between the ring-shaped core and the housing cannot be filled completely to leave interstices (in other words, air layers) that are not filled with the sealing material. Since air is high in heat insulation, such interstices may obstruct heat release from the ring-shaped core to outside the housing. It is therefore desirable to make formation of such interstices as rare as possible.

An object of the invention is provide a noise reduction unit that is superior in the release of heat from a ring-shaped core incorporated therein to the outside.

Embodiments of the present invention provide the following items (1) to (4).

(1) A noise reduction unit comprising:
    a conductor having a winding portion;
    a ring-shaped core made from a magnetic material and being inserted through the winding portion; and
    a housing holding the conductor and the ring-shaped core, the housing having, at a mounting portion for the ring-shaped core, a recess concaving in a direction away from the ring-shaped core; and a support portion supporting the ring-shaped core to have a gap between a bottom surface of the recess and the ring-shaped core; and
    a sealing material charged in the housing, the sealing material being placed into the gap and contacting both of the bottom surface of the recess and the ring-shaped core at the mounting portion.

(2) The noise reduction unit according to item (1), wherein
    at least part of side wall surface of the recess is inclined so that an opening space of the recess increases with distance from the bottom surface of the recess in its recessing direction.

(3) The noise reduction unit according to item (1) or item (2), wherein
    the support portion has a projection-strip-shape to project from the bottom surface of the recess and to extend in a direction crossing a circumferential direction of the ring-shaped core at the mounting portion.

(4) The noise reduction unit according to any one of item (1) to item (3), wherein
    the support portion projects from the bottom surface of the recess and are tapered in such a manner that the area of a cross section taken perpendicularly to the projection direction of each of the support portions is smaller at a position where the support portion is in contact with the ring-shaped core than at a position where the support portion connects to the bottom surface of recess.

According to first aspect of the invention, relating to the item (1), when the combination of the ring-shaped core and the conductor (hereinafter referred to as a "noise filter" for the sake of convenience) is housed in the housing, gaps are formed intentionally between the ring-shaped core and inner wall surfaces (more specifically, the bottom surfaces of the recesses) of the housing. And when the noise filter is sealed in the housing, the sealing material is charged into the gaps and comes into contact with both of the ring-shaped core and the inner wall surfaces (the bottom surfaces of the recesses) of the housing. Thus, heat generated by the ring-shaped core in reducing noise is transmitted to the housing via the sealing material and released to the outside of the housing.

Thus, the noise reduction unit having this configuration is higher in the ability of heat release from the ring-shaped core to the outside than in a case without the above-described gaps and sealing material.

The noise reduction unit having the above configuration provides an advantage that is different from the above advantage. More specifically, the noise reduction unit having this configuration is more resistant to external impact than in a case without the above-described gaps and sealing material, for the following reason. If interstices remain between the ring-shaped core and the housing, when the ring-shaped core or the housing is deformed by impact exerted from outside the noise reduction unit, the ring-shaped core may collide with the inner wall surfaces of the housing. In other words, external impact may be transmitted to the ring-shaped core past the interstices. On the other hand, in general, the sealing material is softer than the material of the housing. Since the sealing material is charged between the ring-shaped core and the housing, external impact can be absorbed by the sealing material. As a result, the noise reduction unit having this configuration is superior in the resistance to external impact.

According to second aspect of the invention, relating to the item (2), at least part of side surfaces of each recess formed in the housing are inclined so as to connect the bottom surface of the recess to a surface around the recess. Thus, when the sealing material is charged into the gaps between the ring-shaped core and the bottom surfaces of the recesses, the sealing material can flow into the gaps from outside the recesses smoothly past the slant surfaces. In other words, the sealing material can flow into the gaps being disturbed less than in a case that the slant surfaces are not formed. As a result, the gaps between the ring-shaped core and the housing can be filled with the sealing material more reliably.

According to third aspect of the invention, relating to the item (3), the ring-shaped core is placed on the tops (ridges) of the support portions which are shaped like projection strips. Since the support portions extend in the direction that crosses the circumferential direction of the ring-shaped core (i.e., in the direction that traverses the ring-shaped core), when charged into the housing the sealing material is charged into the gaps fast flowing alongside the support portions perpendicularly to the ring-shaped core. Thus, the gaps can be filled with the sealing material more reliably than in a case without the support portions of this configuration.

According to fourth aspect of the invention, relating to the item (4), the ring-shaped core is placed on the tops (tips) of the tapered support portions. Thus, the area of contact between each support portion and the ring-shaped core is smaller than in the case that the support portions are not tapered (e.g., the area of the cross section of each support portion taken perpendicularly to its projection direction is constant irrespective of the position in the vertical direction). In other words, the area of contact between the sealing material and the ring-shaped core is larger. As a result, heat generated by the ring-shaped core can be released more efficiently to outside the housing.

ADVANTAGES OF THE INVENTION

According to the invention, it is possible to provide a noise reduction unit that is superior in the release of heat from a ring-shaped core incorporated therein to the outside.

The invention has been described above concisely. The details of the invention will become more apparent when the modes for carrying out the invention (hereinafter referred to as an embodiment) described below are read through with reference to the accompanying drawings.

DETAILED DESCRIPTION

<Embodiment>

A noise reduction unit according to an embodiment of the present invention will be hereinafter described with reference to the drawings.

Figure 1:
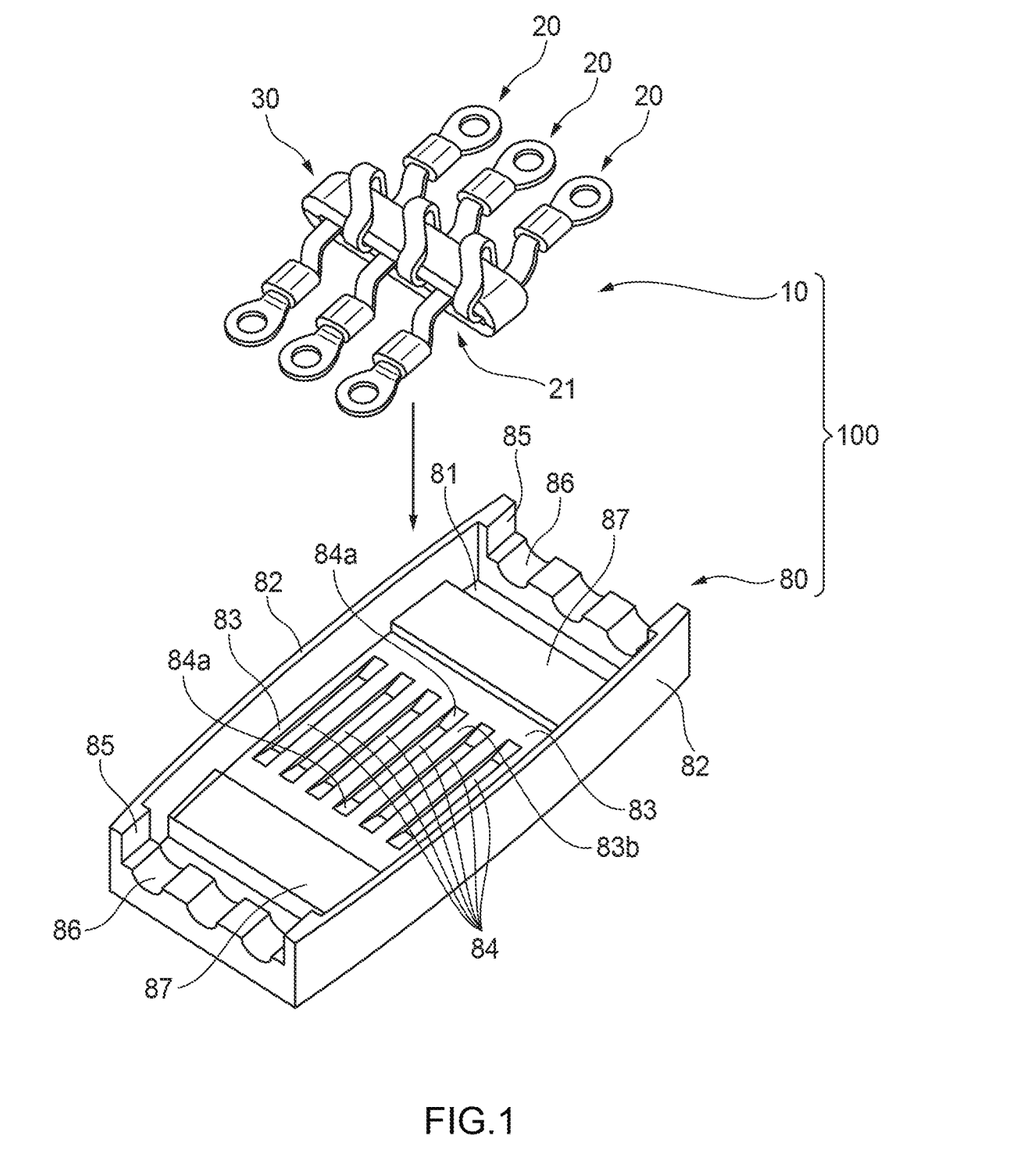
FIG. 1 is an exploded perspective view of a noise reduction unit according to an embodiment of the present invention.

As shown in FIG. 1, a noise reduction unit 100 according to the embodiment is equipped with a noise filter 10 and a housing 80 which houses the noise filter 10. First, the noise filter 10 will be described by mainly referring to FIGS. 2A and 2B, 3, and 5.

Figure 2A:
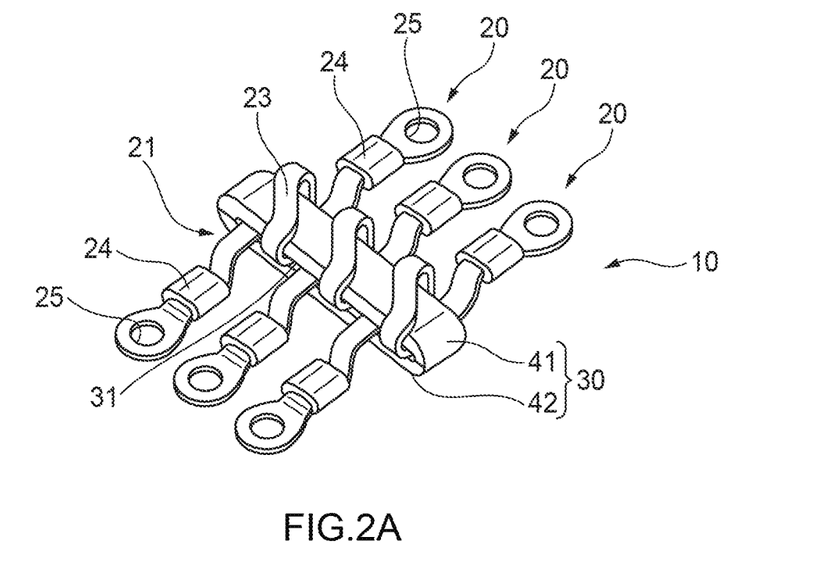
FIGS. 2A and 2B are perspective views, as viewed from the front side and the rear side, respectively, of a noise filter shown in FIG. 1.
Figure 2B:
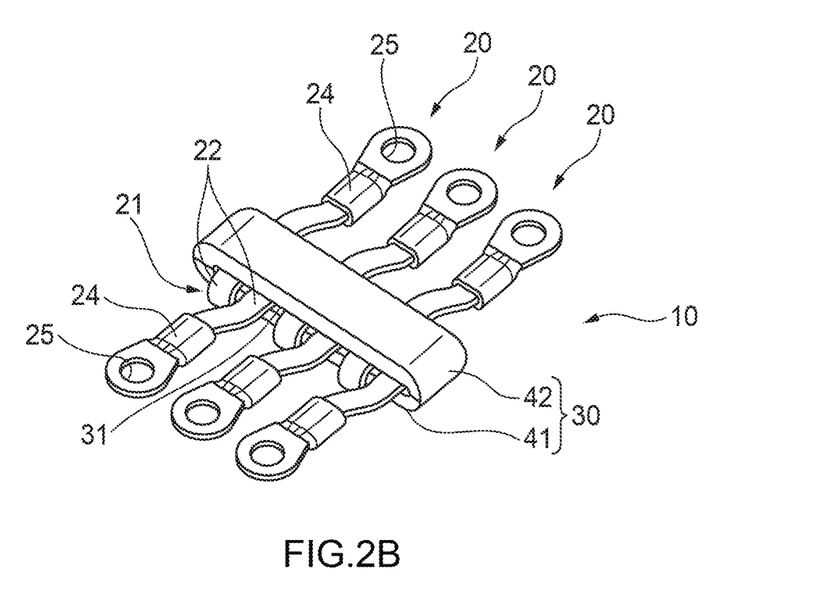
Figure 3:
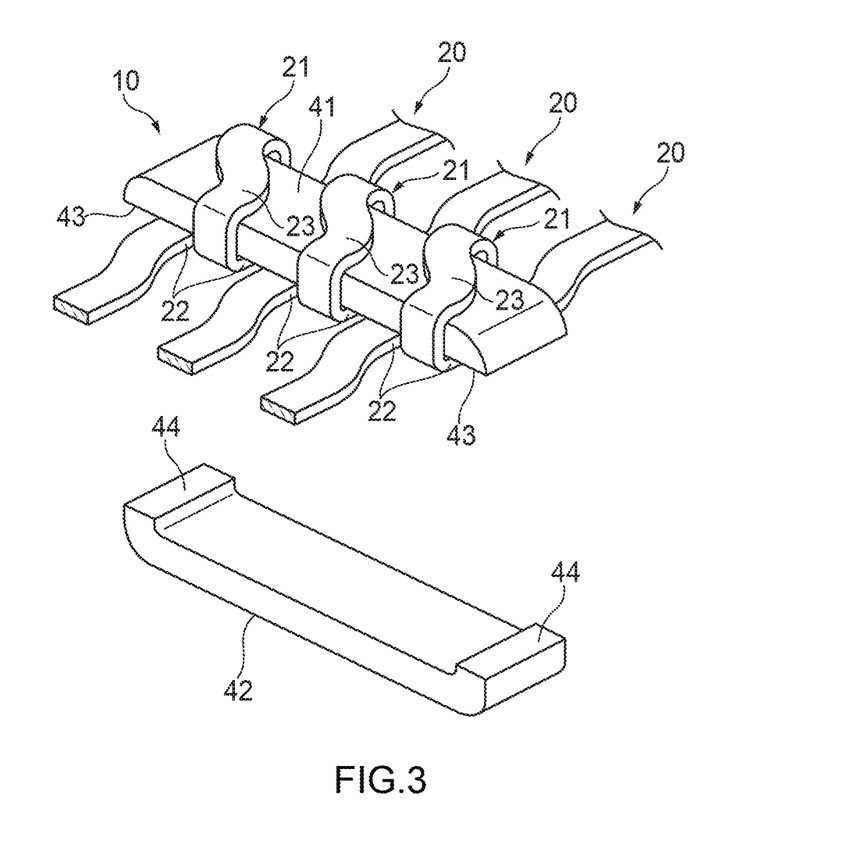
FIG. 3 is an exploded perspective view of the noise filter shown in FIG. 1.

As shown in FIGS. 2A and 2B and FIG. 3, the noise filter 10 has plural (in this example, three) conductors 20 and a ring-shaped core 30. For example, the noise filter 10 is provided for a wire harness that connects an inverter and a motor of an electric vehicle, a hybrid car, or the like. The inverter converts a DC current supplied from a power source such as a battery into an AC current and supplies the resulting AC current to the motor for rotating wheels. Since the inverter performs the above conversion by switching an electric circuit at high speed, high-frequency noise may be generated due to the switching. Provided in the wire harness that connects the inverter and the motor, the noise filter 10 reduces such high-frequency noise.

Originally, the conductors 20 are flat-plate-like busbars produced by, for example, punching a conductive metal plate into strips. A middle portion of each conductor 20 is made a ring-shaped winding portion 21 that is formed by, for example, bending so as to project in the vertical direction. The winding portion 21 is inclined in a plan view, whereby two end portions 22 (see FIGS. 2A and 3) of the winding portion 21 are arranged in the width direction so as to be spaced from each other (i.e., not to be in contact with each other) in the width direction.

In the following description, for convenience of description, a portion opposed to the two end portions 22 in the vertical direction (i.e., opposite to the two end portions 22 in a radial direction of the winding portion 21), of the winding portion 21 will be referred as a projection portion 23 (see FIGS. 2A and 3). As shown in FIGS. 2A and 3, it can be said that the projection portion 23 of the winding portion 21 is a portion, located on an outer circumferential surface of the ring-shaped core 30, of the winding portion 21.

Terminals 24 are fixed to two respective end portions of each conductor 20. Each terminal 24 has a bolt insertion hole 25 and is fixed to the associated conductor 20 by, for example, crimping and thereby connected to it electrically. The terminals 24 (and the bolt insertion holes 25) of each conductor 20 are used for connection to wires 1 of a wire harness (described later with reference to FIG. 4).

For example, the ring-shaped core 30 is made of a magnetic material such as ferrite. The ring-shaped core 30 is shaped like a flat ring having an insertion passage 31 (see FIGS. 2A and 2B and FIG. 5) which is an elliptical hole. The insertion passage 31 of the ring-shaped core 30 is a little greater in height than the thickness of the conductors 20.

The ring-shaped core 30 is composed of a pair of divisional cores 41 and 42. The flat ring-shaped core 30 having the insertion passage 31 is formed by combining together the divisional cores 41 and 42 that are set vertically.

Each of the divisional cores 41 and 42 extends straightly. The plural conductors 20 are wound on the one divisional core 41 which is set on one side in the vertical direction, so as to be arranged in a row (see FIGS. 2B and 3). The two end portions 22 of the winding portion 21 of each conductor 20 that is wound on the divisional core 41 are inserted in the insertion passage 31 (see FIGS. 2B and 5).

As shown in FIG. 3, surface portions 43, located at the two respective ends in the longitudinal direction of the one divisional core 41 and facing the other divisional core 42, of the one divisional core 41 are joining surfaces 44. And two end portions, in its longitudinal direction, of the other divisional core 42 project toward the one divisional core 41 and end surfaces of the projected portions are joining surfaces 44.

The divisional cores 41 and 42 are joined to each other by bringing each pair of joining surfaces 43 and 44 into contact with each other. Each pair of joining surfaces 43 and 44 of the divisional cores 41 and 42 are bonded to each other by a magnetic adhesive member (not shown) that is in paste or sheet form and is provided between the joining surfaces 43 and 44. The magnetic adhesive member is made of a material obtained by adding a magnetic material such as a ferrite powder to an adhesive. In this manner, a ring-shaped magnetic path is formed along the ring-shaped core 30 by the divisional cores 41 and 42 that are bonded to each other.

How to assemble the noise filter 10 which is configured as described above will be described below briefly.

First, plural conductors 20 having respective winding portions 21 are prepared. Then, as shown in FIG. 3, the plural conductors 20 are attached to the one divisional core 41 of a ring-shaped core 30. More specifically, the divisional core 41 that is oriented so that the joining surfaces 43 are located on the bottom side is inserted into the winding portions 21 of the conductors 20 that are oriented so that the projection portions 23 of the winding portions 21 are located on the top side. As a result, the conductors 20 are wound on the one divisional core 41 so as to be arranged in a row.

Subsequently, a magnetic adhesive member is applied to one or both of each pair of joining surfaces 43 and 44 of the divisional cores 41 and 42 and each pair of joining surfaces 43 and 44 of the divisional cores 41 and 42 are brought into contact with each other. As a result, each pair of joining surfaces 43 and 44 of the divisional cores 41 and 42 are bonded to each other by the adhesive member, whereby the divisional cores 41 and 42 are integrated with each other into a ring-shaped core 30. In this manner, a noise filter 10 is formed in which the plural conductors 20 are attached to the ring-shaped core 30 which is composed of the pair of divisional cores 41 and 42. The thus-produced noise filter 10 can reduce noise by means of the ring-shaped core 30 having a ring-shaped magnetic path when currents flow through the conductors 20.

The noise filter 10 has been described above. Next, the housing 80 which houses the noise filter 10 will be described by mainly referring to FIGS. 1, 4, and 5.

As shown in FIG. 1, the housing 80 is made of an insulative synthetic resin and has a bottom plate 81 and side walls 82 which are erected from the bottom plate 81 at the two respective sides in the width direction. The housing 80 is shaped like a rectangular box having a housing space that is open at the top. A central portion of the bottom plate 81 is a core holding portion 83 which defines a central portion of the housing space in which to set the noise filter 10 (see FIGS. 4 and 5).

The top surface (flat surface; see FIG. 5) 83*a* of the core holding portion 83 is formed with plural (in this embodiment, six) recesses 84 which extend in the longitudinal direction, are arranged in the width direction at intervals and have the same width. A rib 83*b* which is shaped like a projection strip and extends in the longitudinal direction (see FIGS. 1 and 5) is formed between adjacent recesses 84 which are formed in the above manner. In this example, five ribs 83*b* are formed. The ribs 83*b* extend in the direction perpendicular to the circumferential direction of the ring-shaped core 30 in a state that the noise filter 10 is set on the core holding portion 83 of the housing 80.

Each recess 84 is formed with, at the two respective ends in the longitudinal direction, slant surfaces 84*a* which are inclined in such a manner as to become shallower as the position goes outward in the longitudinal direction. In other words, the slant surfaces 84*a* of each recess 84 are inclined in such a manner that the horizontal sectional area of the recess 84 increases as the position goes away from its bottom surface.

The two end portions, in the longitudinal direction, of each recess 84 is designed so as to be located outside, in the longitudinal direction, the two respective ends of the ring-shaped core 30 in a state that the noise filter 10 is set on the core holding portion 83 of the housing 80. In other words, in a state that the noise filter 10 is set on the core holding portion 83 of the housing 80, the pair of slant surfaces 84*a*, located at the two respective ends in the longitudinal direction, of each recess 84 are not covered with the ring-shaped core 30.

The housing 80 has wire introduction portions 85 at the two respective ends in the longitudinal direction. As described later, the wire introduction portions 85 are portions from which to introduce wires 1 of a wire harness (see FIG. 4). Each wire introduction portion 85 is formed with plural (in this embodiment, three) U-shaped wire holding grooves 86 which are spaced from each other in the width direction. The bottom plate 81 is formed with, between the core holding portion 83 and the wire introduction portions 85, terminal stages 87 which project upward from the level of the top surface 83*a* of the core holding portion 83. Insert nuts (not shown) are buried in the terminal stages 87 by insert molding, for example.

A procedure for housing the completed noise filter 10 in the above-configured housing 80 will be described below briefly. To house the noise filter 10 in the housing 80, first, as shown in FIG. 1, the ring-shaped core 30 of the noise filter 10 is brought close to the core holding portion 83 of the housing 80 with the projection portions 23 of the winding portions 21 of the respective conductors 20 up (i.e., the noise filter 10 is oriented so that the two end portions 22 are opposed to the core holding portion 83 of the housing 80).

Figure 5:
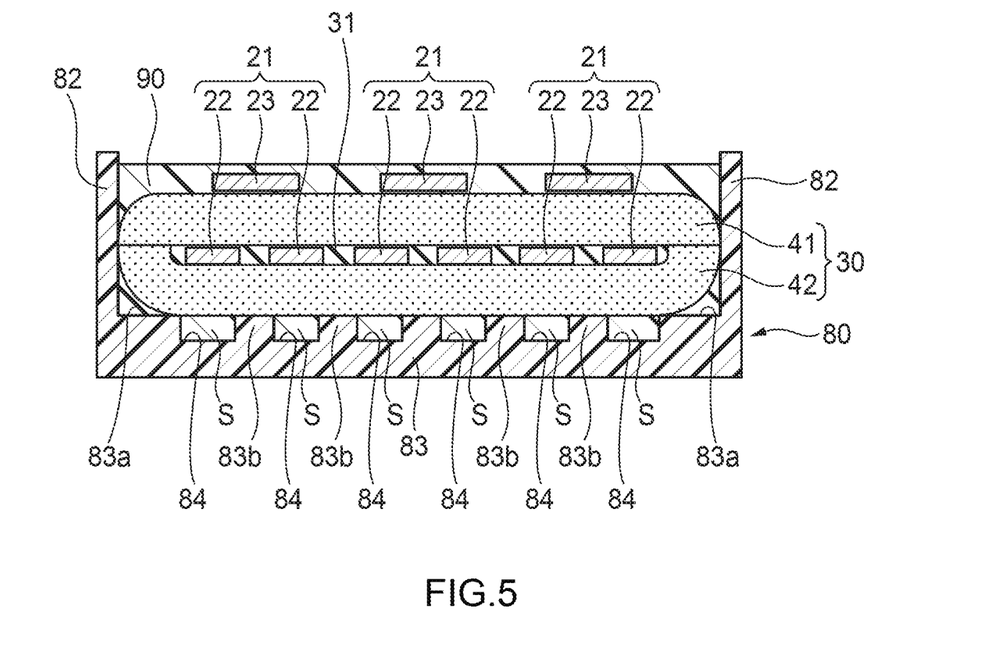
FIG. 5 is a sectional view taken along line A-A in FIG. 4.

Then the ring-shaped core 30 is placed on the top surface 83*a* of the core holding portion 83 (see FIG. 5). As a result, the terminals 24 which are fixed to the conductors 20 of the noise filter 10 are placed on top of the terminal stages 87, more specifically, over the respective insert nuts.

As shown in FIG. 5, in a state that the ring-shaped core 30 is placed on the top surface 83*a* of the core holding portion 83, the ribs 83*b* of the core holding portion 83 support the ring-shaped core 30. In addition, gaps S are formed between the ring-shaped core 30 and the bottom surfaces of the recesses 84, respectively.

Subsequently, as shown in FIG. 5, a sealing material 90 which is a synthetic resin such as an epoxy resin is charged into the housing 80 in which the ring-shaped core 30 is placed on the top surface 83*a* of the core holding portion 83. For example, the sealing material 90 is charged to the level of the top surfaces of the terminal stages 87.

When the sealing material 90 is charged, since the two end portions (i.e., slant surfaces 84a), in the longitudinal direction, of each recess 84 are not covered with the ring-shaped core 30, the sealing material 90 goes into the recesses 84 past their slant surfaces 84a. The sealing material 90 is charged into the gaps S which are located between the ring-shaped core 30 and the bottom surfaces of the recesses 84 as it goes along the recesses 84 (ribs 83b) which extend in the longitudinal direction.

Since as described above the sealing material 90 flows into the gaps S from outside the recesses 84 past their slant surfaces 84a, the flow of the sealing material 90 is disturbed less and the gaps S can be filled up more reliably than in a case that the slant surfaces 84a are not formed. As a result, as shown in FIG. 5, the sealing material 90 is charged into the gaps S reliably and comes into contact with both of the ring-shaped core 30 and the bottom surfaces of the recesses 84.

By charging the sealing material 90 into the housing 80 in the above-described manner, the noise filter 10 having the ring-shaped core 30 made of a magnetic material can be fixed and protected reliably. And the noise reduction unit 100 can be increased in impact resistance. In addition, the noise reduction unit 100 can be miniaturized because it no longer requires a complex waterproof structure. By putting a lid on top of the housing 80, the waterproofness of the noise reduction unit 100 can be made even so high that it can be installed outside the vehicle body.

The noise reduction unit 100 in which the noise filter 10 is housed in and fixed to the housing 80 can be obtained by executing the above-described process.

Figure 4:
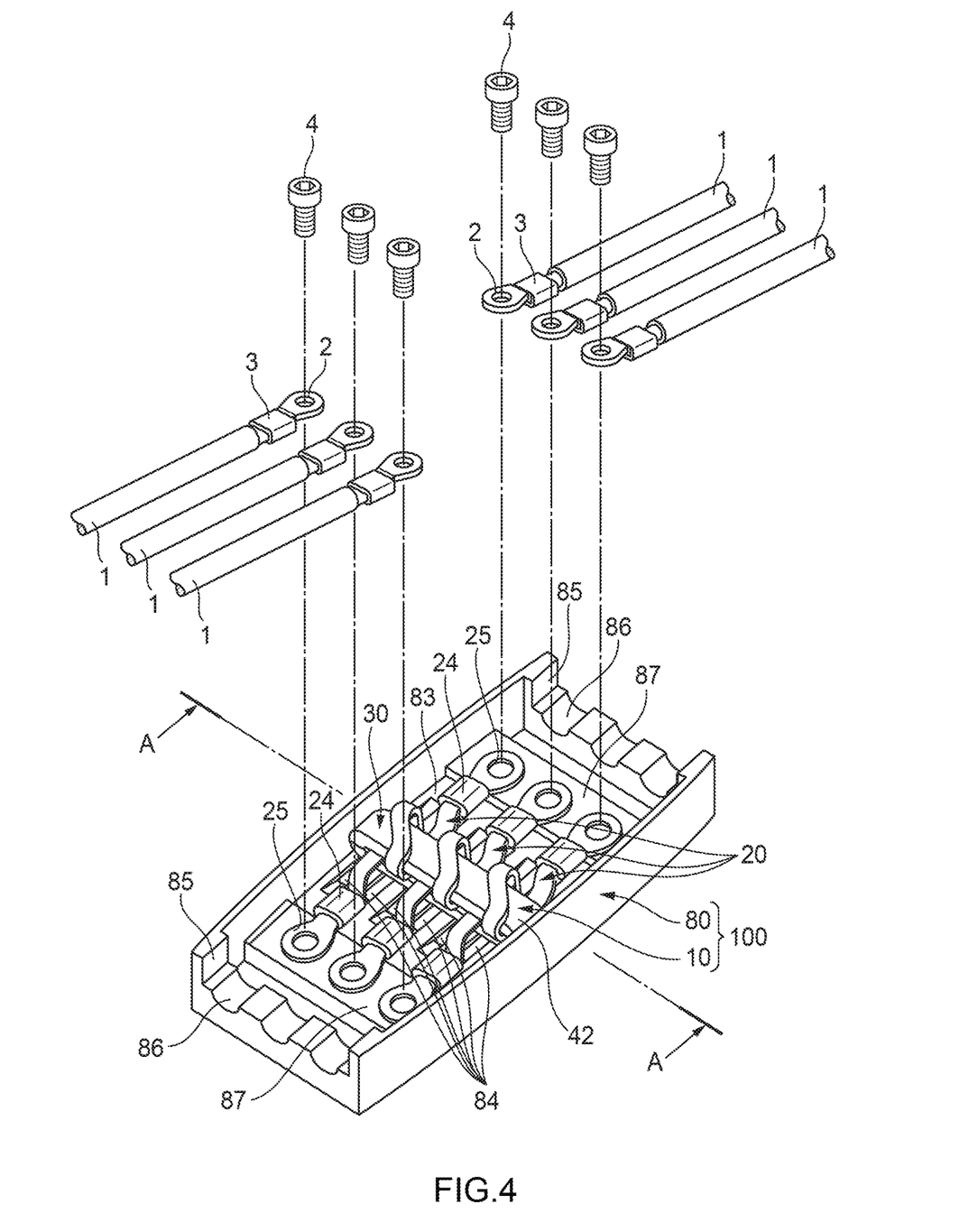
FIG. 4 is a perspective view illustrating a procedure according to which wires of a wire harness are attached to the noise reduction unit according to the embodiment.

For example, as shown in FIG. 4, wires 1, extending from an inverter and a motor, of a wire harness are connected to the noise reduction unit 100. A terminal 3 having a bolt insertion hole 2 at one end is connected to each wire 1. Each wire 1 is introduced through a wire introduction portion 85 of the housing 80 and is set and held in a wire holding groove 86. The terminal 3 of each wire 1 is placed on the terminal 24 of the corresponding conductor 20 that is placed on top of the associated terminal stage 87, whereby the bolt insertion holes 2 and 25 communicate with each other. A bolt 4 is inserted into these bolt insertion holes 2 and 25 and screwed into the associated insert nut of the terminal stage 87, whereby the terminal 3 of the wire 1 and the terminal 24 of the conductor 20 of the noise filter 10 are fastened to the terminal stage 87 and electrically connected to each other.

In this manner, the wires 1, extending from the inverter and the motor, of the wire harness are connected to the noise reduction unit 100 having the noise filter 10, whereby noise generated by high-speed switching in the inverter can be reduced properly. Furthermore, since the noise filter 10 which is low in height is housed in the housing 80, the noise reduction unit 100 is reduced in height and hence can be installed in a narrow space. For example, the noise reduction unit 100 which is connected to a wire harness of a vehicle or the like at its halfway position can be fixed to a floor panel of the vehicle. Still further, the noise filter 10 having the ring-shaped core 30 made of a magnetic material can be protected by the housing 80.

As described above, according to the noise reduction unit 100 of the embodiment, when the noise filter 10 is housed in the housing 80, gaps S are formed intentionally between the ring-shaped core 30 and inner wall surfaces (more specifically, the bottom surfaces of the recesses 84) of the housing 80 and the sealing material 90 is charged into the gaps S. The sealing material 90 is in contact with both of the ring-shaped core 30 and the inner wall surfaces (the bottom surfaces of the recesses 84) of the housing 80. Thus, heat generated by the ring-shaped core 30 is transmitted to the housing 80 via the sealing material 90 and released to the outside of the housing 80.

Thus, the noise reduction unit 100 having the above-described configuration is higher in the ability of heat release from the ring-shaped core 30 to the outside than in a case without the sealing material 90 that is charged so as to connect the ring-shaped core 30 and the inner wall surfaces of the housing 80.

The sealing material 90 is softer than the material of the housing 80. In the above-described configuration, since the sealing material 90 is charged between the ring-shaped core 30 and the housing 80, when impact or the like is exerted on the noise reduction unit 100 from outside, it can be absorbed by the sealing material 90. Thus, the noise reduction unit 100 having this configuration is more resistant to external impact than in a case that no sealing agent is charged between the ring-shaped core 30 and the housing 80.

Slant surfaces 84a are formed at the two ends, in the longitudinal direction, of each recess 84 of the housing 80. Thus, when the sealing material 90 is charged into the gaps S between the ring-shaped core 30 and the bottom surfaces of the recesses 84, the sealing material 90 flows into the gaps S from outside the recesses 84 past the slant surfaces 84. Thus, the flow of the sealing material 90 is disturbed less than in a case that the slant surfaces 84a are not formed. As a result, the gaps S can be filled with the sealing material 90 more reliably.

Furthermore, each rib 83b that is located between adjacent recesses 84 is shaped like a projection strip and the ring-shaped core 30 is placed on the tops (ridges) of those ribs 83b. Since the ribs 83b extend in the direction that crosses the circumferential direction of the ring-shaped core 30 (i.e., in the longitudinal direction of the housing 80), when charged into the housing 80 the sealing material 90 passes the gaps S between the ring-shaped core 30 and the housing 80 (i.e., the bottom surfaces of the recesses 84). Thus, the gaps S can be filled with the sealing material 90 reliably.

<Other Embodiments>

The invention is not limited to the above embodiment and various modifications, improvements, etc. can be made as appropriate within the scope of the invention. The materials, shapes, sets of dimensions, numbers, locations, etc. of the respective constituent elements of the above embodiment are not limited to those disclosed but can be determined in desired manners as long as the invention can be implemented.

For one thing, although in the above embodiment each recess 84 of the housing 80 is formed with the slant surfaces 84a, each recess 84 need not always be formed with the slant surfaces 84a.

In the above embodiment, each rib 83b that is located between adjacent recesses 84 of the housing 80 is shaped like a projection strip that extends in the direction perpendicular to the circumferential direction of the ring-shaped core 30 (i.e., in the longitudinal direction of the housing 80). However, each rib 83b may be shaped like a projection strip that extends in a direction that is different from the direction perpendicular to the circumferential direction of the ring-shaped core 30 (i.e., the longitudinal direction of the housing 80).

Figure 6A:
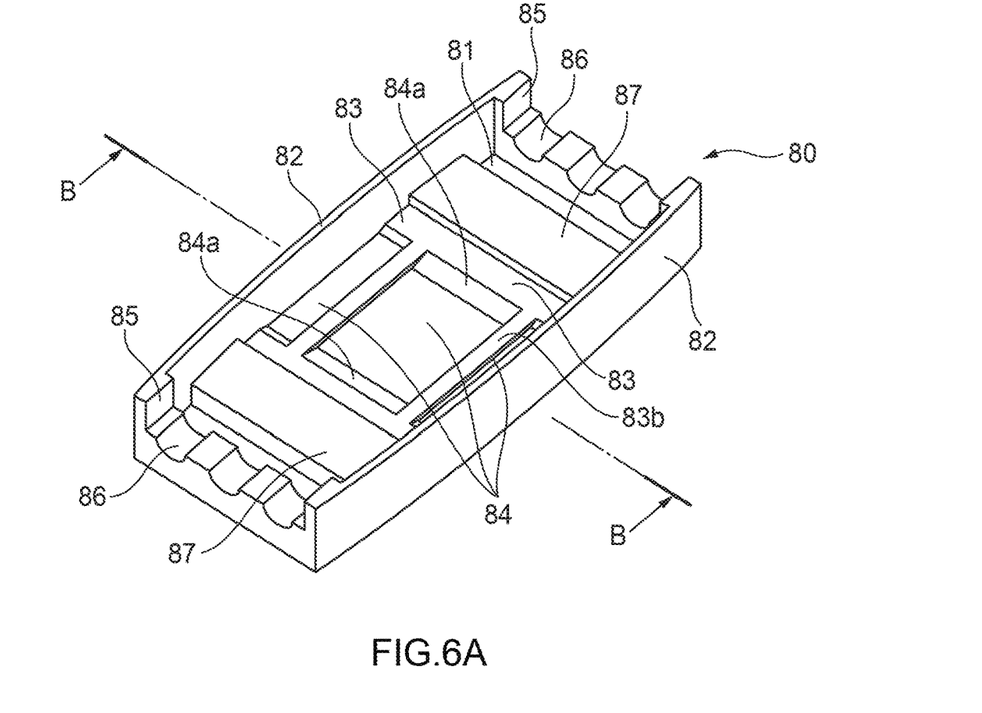
FIG. 6A is a perspective view of a housing of a noise reduction unit according to a modification of the embodiment.
Figure 6B:
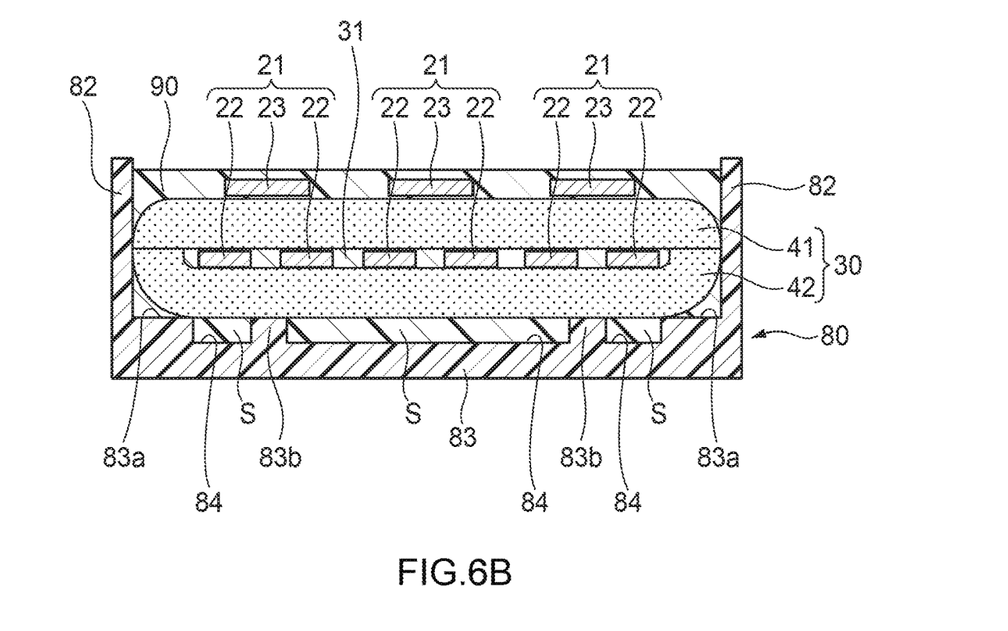
FIG. 6B is a sectional view taken along line B-B in FIG. 6A.

In the above embodiment, the plural recesses 84 have the same width (see FIG. 1). However, as shown in FIGS. 6A and 6B, plural recesses 84 may be formed so as to have different widths. In the example of FIGS. 6A and 6B, among three recesses 84 which are arranged in the width direction at intervals, the width of the central recess 84 is greater than that of the two recesses 84 located on the two respective sides.

Figure 7A:
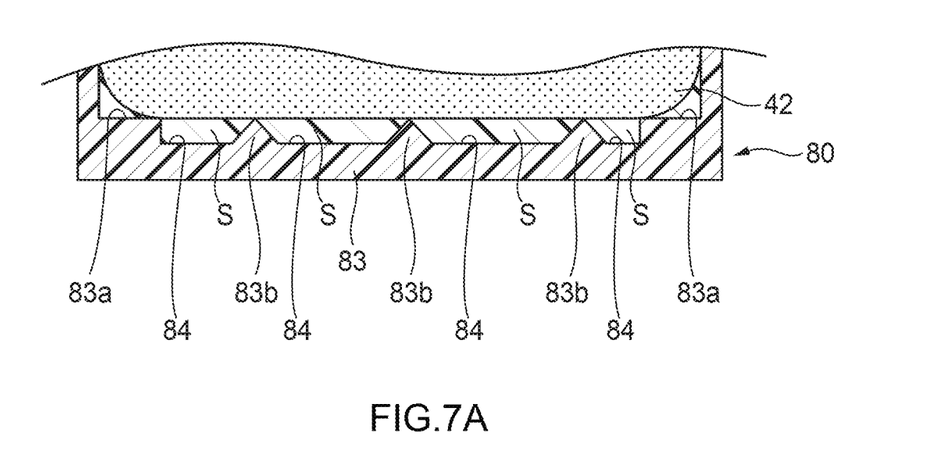
FIGS. 7A and 7B are sectional views corresponding to FIG. 5 of noise reduction units according to other modifications of the embodiment, respectively.
Figure 7B:
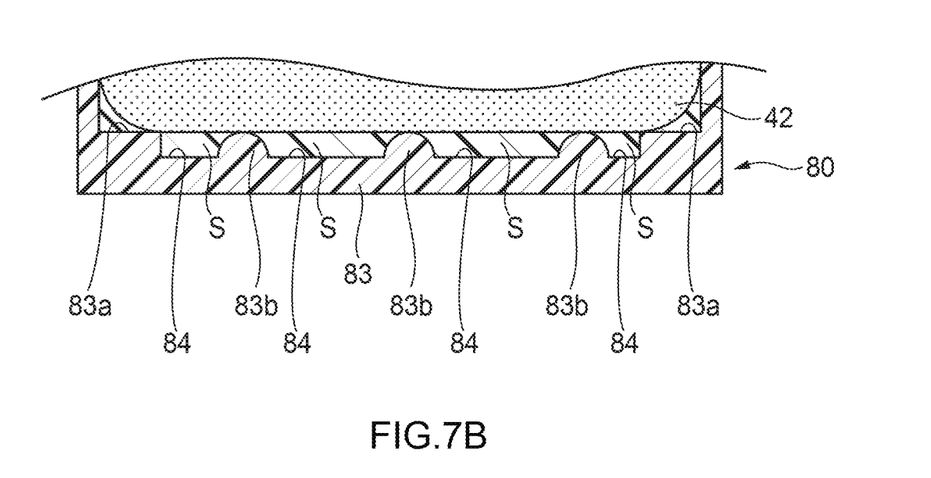

In the above embodiment, each rib 83*b* extending in the longitudinal direction is constant in the area of its cross section taken perpendicularly to its projection direction irrespective of the position in the vertical direction. However, as shown in FIGS. 7A and 7B, the area of the cross section, taken perpendicularly to its projection direction, of each rib 83*b* extending in the longitudinal direction may decrease as the position comes closer to the ring-shaped core 30 (i.e., each rib 83*b* may be tapered). More specifically, the shape of the cross section of each rib 83*b* taken perpendicularly to its extension direction (the longitudinal direction of the housing 80) is triangular in the example of FIG. 7A and semicircular in the example of FIG. 7B.

Where the ribs 83*b* are tapered, the area of contact between each rib 83*b* and the ring-shaped core 30 is smaller than in the case that the ribs 83*b* are not tapered (e.g., the area of the cross section of each rib 83*b* taken perpendicularly to its projection direction is constant irrespective of the position in the vertical direction). In other words, the area of contact between the sealing material 90 and the ring-shaped core 30 is larger. Thus, heat generated by the ring-shaped core 30 is released more efficiently to outside the housing 80; the performance of heat release from the ring-shaped core 30 to the outside can be made even higher.

Figure 8:
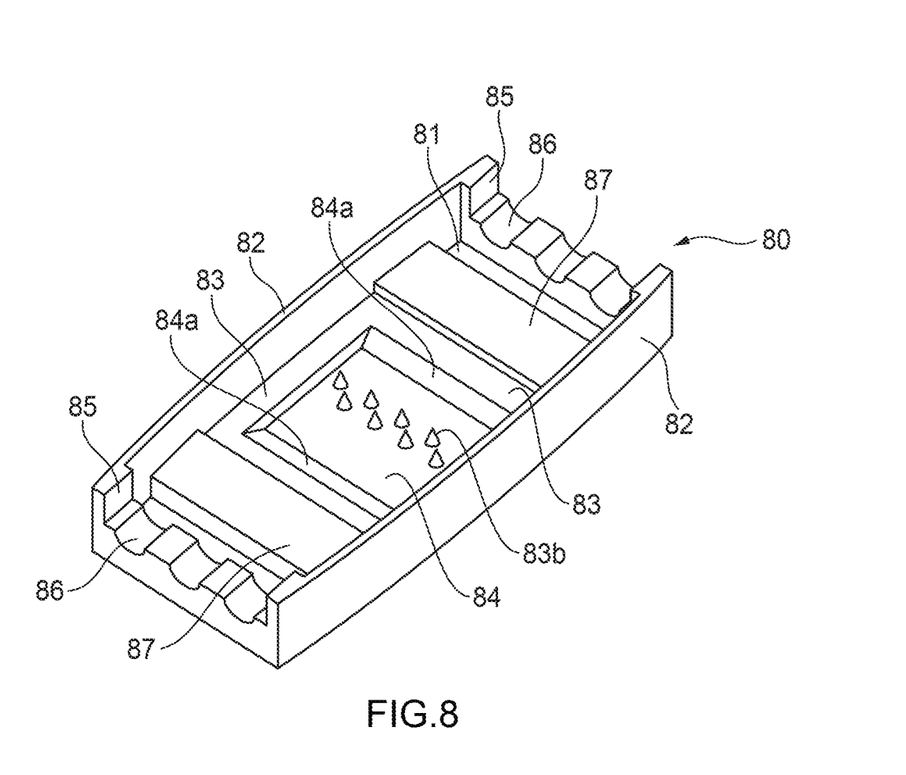
FIG. 8 is a perspective view of a housing of a noise reduction unit according to a further modification of the embodiment.

In the modifications shown in FIGS. 7A and 7B, each of the plural ribs 83*b* extending in the longitudinal direction are formed between adjacent ones of the recesses 84 extending in the longitudinal direction, as "tapered support portions" (a term used in the invention). Alternatively, as shown in FIG. 8, tapered plural ribs 83*b* may be formed as "tapered support portions" so as to project from the bottom surface of a single, large recess 84 that is formed in the top surface 83*a* of the core holding portion 83 of the housing 80. In the modification shown in FIG. 8, the plural ribs 83*b* are arranged on the bottom surface of the single, large recess 84.

Although in the above embodiment the conductors 20 of the noise filter 10 are flat-plate-like busbars, the conductors 20 may be, for example, insulated electric wires in each of which a core wire is covered with an outer sheath.

In the above embodiment, the ring-shaped core 30 is composed of the straight divisional cores 41 and 42. However, it suffices that at least the one divisional core 41 which is inserted through the winding portions 21 of the conductors 20 be straight; the other divisional core 42 need not always be straight and may be curved, for example.

Although in the above embodiment the ring-shaped core 30 is the combination of the pair of (i.e., top and bottom) divisional cores 41 and 42, the ring-shaped core 30 may be a combination of a pair of divisional cores that are attached to each other in the horizontal direction. As a further alternative, the ring-shaped core 30 may be of a unitized (i.e., single body) type, instead of the divisional type (a combination of a pair of divisional cores).

Features of the above-described noise reduction unit 100 according to the embodiment of the invention will be summarized below concisely as items (1) to (5):

(1) A noise reduction unit (100) comprising:
a conductor (20) having a winding portion (21);
a ring-shaped core (30) made from a magnetic material and being inserted through the winding portion (21); and
a housing (80) holding the conductor (20) and the ring-shaped core (30), the housing (80) having, at a mounting portion (83) for the ring-shaped core (30), a recess (84) concaving in a direction away from the ring-shaped core (30); and a support portion (83*b*) supporting the ring-shaped core (30) to have a gap (S) between a bottom surface of the recess (84) and the ring-shaped core (30); and a sealing material (90) charged in the housing (80), the sealing material (90) being placed into the gap (S) and contacting both of the bottom surface of the recess (84) and the ring-shaped core (30) at the mounting portion (83).

(2) The noise reduction unit (100) according to item (1), wherein
at least part of side wall surface of the recess (84) is inclined so that an opening space of the recess (84) increases with distance from the bottom surface of the recess (84) in its recessing direction.

(3) The noise reduction unit (100) according to item (1) or item (2), wherein
the support portion (83*b*) has a projection-strip-shape to project from the bottom surface of the recess (84) and to extend in a direction crossing a circumferential direction of the ring-shaped core (30) at the mounting portion (83).

(4) The noise reduction unit (100) according to any one of item (1) to item (3), wherein
the support portion (83*b*) projects from the bottom surface of the recess (84) and are tapered in such a manner that the area of a cross section taken perpendicularly to the projection direction of each of the support portions is smaller at a position where the support portion (83*b*) is in contact with the ring-shaped core (30) than at a position where the support portion (83*b*) connects to the bottom surface of recess.

(5) The noise reduction unit (100) according to any one of item (1) to item (4), wherein
a ring-shaped core (30) is formed form a plurality of divisional parts, and at least one divisional part inserted through the winding portion (21) of the conductor (20) has a straight shape.

REFERENCE SIGNS LIST

20: Conductor
21: Winding portion
30: Ring-shaped core
80: Housing
83: Core holding portion (mounting portion)
83*b*: Rib, projection (support portion)
84: Recess
84*a*: Slant surface
90: Sealing material
100: Noise reduction unit
S: Gap

The invention claimed is:

1. A noise reduction unit comprising:
a conductor having a winding portion;
a ring-shaped core made from a magnetic material and being inserted through the winding portion;
a housing holding the conductor and the ring-shaped core, the housing having, at a mounting portion for the ring-shaped core, a recess concaving in a direction away from the ring-shaped core; and a support portion supporting the ring-shaped core to have a gap between a bottom surface of the recess and the ring-shaped core; and
a sealing material charged in the housing, the sealing material being placed into the gap and contacting both of the bottom surface of the recess and the ring-shaped core at the mounting portion, wherein at least part of side wall surface of the recess is inclined so that an opening space of the recess increases with distance from the bottom surface of the recess in its recessing direction.

2. The noise reduction unit according to claim 1, wherein a ring-shaped core is formed by a plurality of divisional parts, and at least one divisional part inserted through the winding portion of the conductor has a straight shape.

3. The noise reduction unit according to claim 1, wherein the recess comprises a plurality of recesses configured to be arranged at intervals in a width direction.

4. The noise reduction unit according to claim 3, wherein the plurality of recesses comprise a central recess, wherein the width of the central recess is greater than the width of at least one other recess.

5. The noise reduction unit according to claim 1, wherein the entirety of the winding portion is located outside the gap.

6. A noise reduction unit comprising:
a conductor having a winding portion;
a ring-shaped core made from a magnetic material and being inserted through the winding portion;
a housing holding the conductor and the ring-shaped core, the housing having, at a mounting portion for the ring-shaped core, a recess concaving in a direction away from the ring-shaped core; and a support portion supporting the ring-shaped core to have a gap between a bottom surface of the recess and the ring-shaped core; and
a sealing material charged in the housing, the sealing material being placed into the gap and contacting both of the bottom surface of the recess and the ring-shaped core at the mounting portion,
wherein the support portion has a projection-strip-shape to project from the bottom surface of the recess and to extend in a direction crossing a circumferential direction of the ring-shaped core at the mounting portion.

7. A noise reduction unit comprising:
a conductor having a winding portion;
a ring-shaped core made from a magnetic material and being inserted through the winding portion:
a housing holding the conductor and the ring-shaped core, the housing having, at a mounting portion for the ring-shaped core, a recess concaving in a direction away from the ring-shaped core; and a support portion supporting the ring-shaped core to have a gap between a bottom surface of the recess and the ring-shaped core; and
a sealing material charged in the housing, the sealing material being placed into the gap and contacting both of the bottom surface of the recess and the ring-shaped core at the mounting portion,
wherein the support portion projects from the bottom surface of the recess and are tapered in such a manner that the area of a cross section taken perpendicularly to the projection direction of each of the support portions is smaller at a position where the support portion is in contact with the ring-shaped core than at a position where the support portion connects to the bottom surface of recess.

* * * * *